Nov. 4, 1924.
H. T. NEWBIGIN
1,514,583
JOURNAL AND OTHER BEARING
Filed Nov. 11, 1922  3 Sheets-Sheet 1
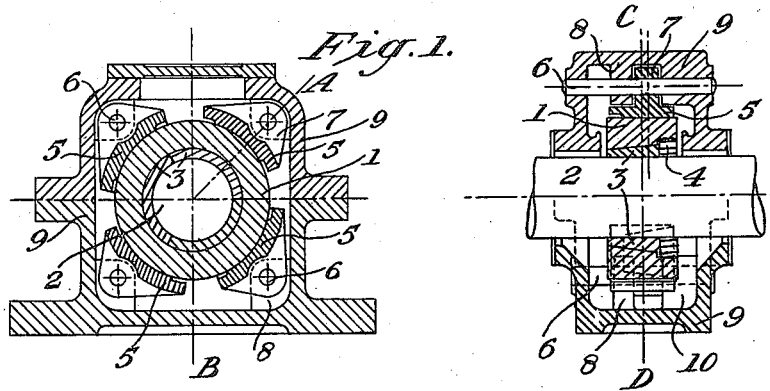
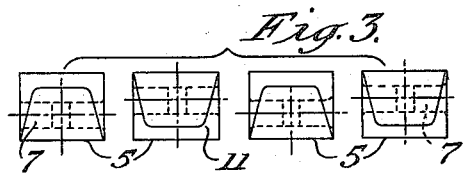
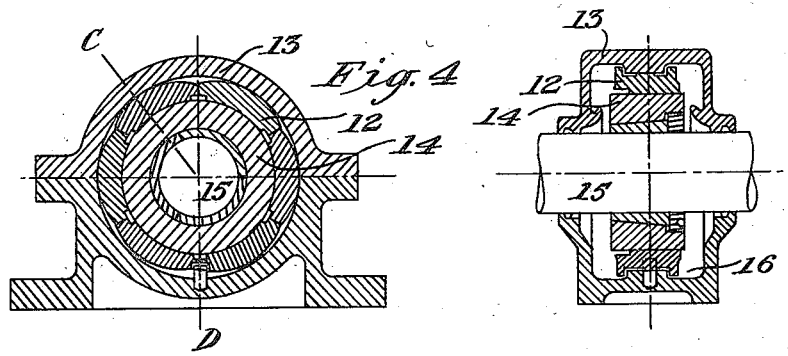
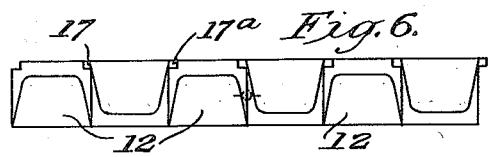
Inventor
Henry T. Newbigin
By
Attorney

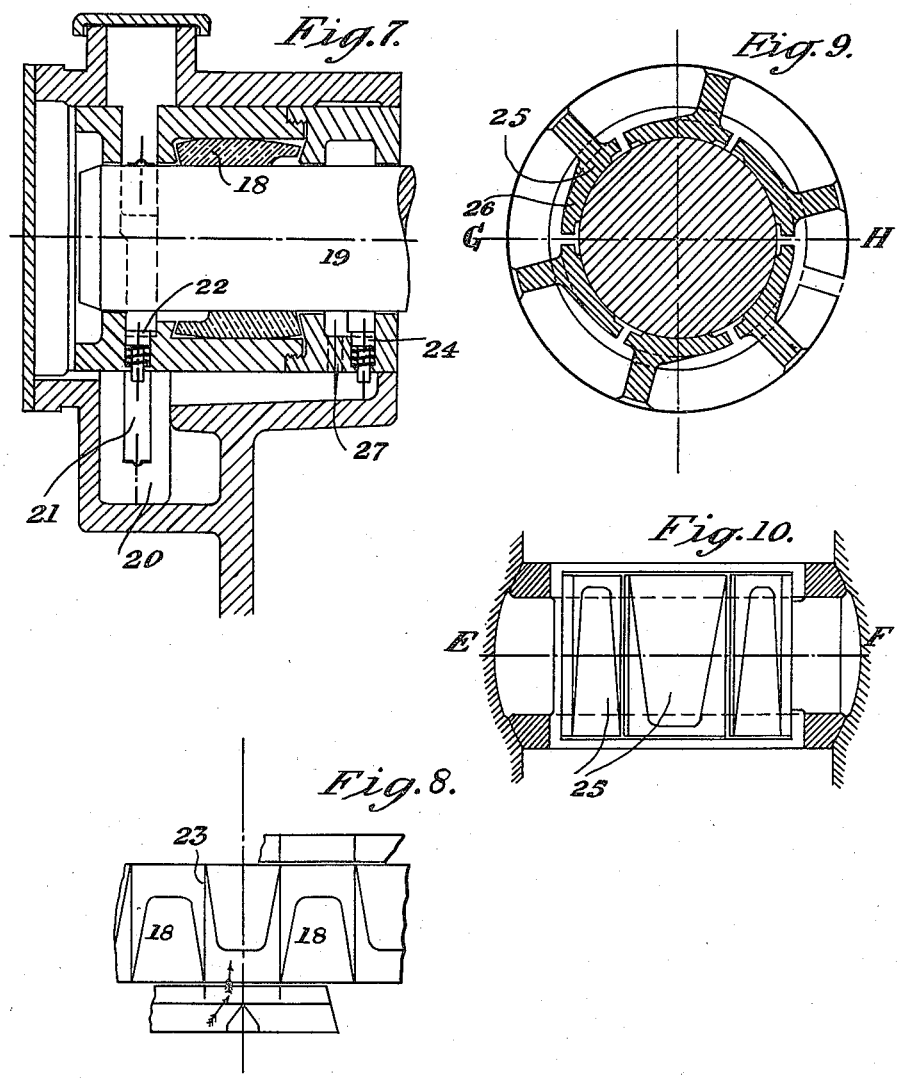

Nov. 4, 1924.
H. T. NEWBIGIN
1,514,583
JOURNAL AND OTHER BEARING
Filed Nov. 11, 1922     3 Sheets-Sheet 3
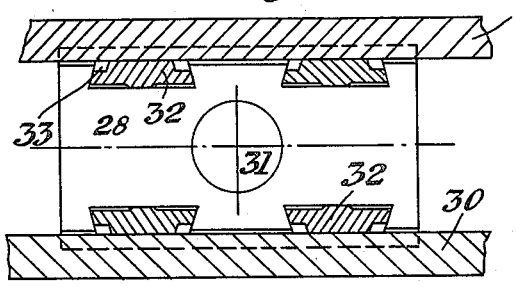
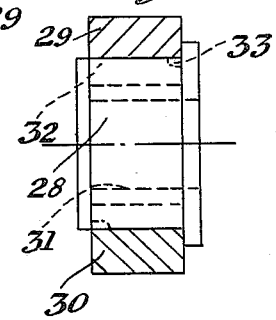
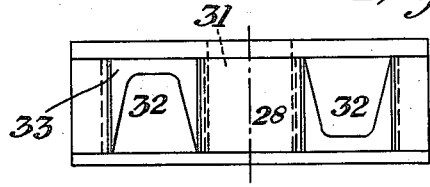

Patented Nov. 4, 1924.

1,514,583

UNITED STATES PATENT OFFICE.

HENRY T. NEWBIGIN, OF NEWCASTLE-ON-TYNE, ENGLAND.

JOURNAL AND OTHER BEARING.

Application filed November 11, 1922. Serial No. 600,363.

*To all whom it may concern:*

Be it known that I, HENRY THORNTON NEWBIGIN, a subject of the King of Great Britain, residing in Newcastle-on-Tyne, England, have invented certain new and useful Improvements Relating to Journal and Other Bearings, of which the following is a specification.

This invention relates to the lubrication of journal and other bearings, of the kind in which the bearing elements are pivoted for the purpose of securing the formation of a number of pressure oil films between the co-operating surfaces, as described in U. S. Patent No. 1,322,332, granted November 18, 1919, to me, or in which the elements of the bearing surface are constructed so as to deflect under load, as described in U. S. Patent No. 1,315,735, granted September 9, 1919, to A. G. M. Michell.

In such bearings there are series of bearing elements arranged circumferentially in tandem, each of which requires its own oil supply in order to function in the desired manner.

In the bearing described in U. S. Patent No. 1,322,332, referred to above, the lubricant is circulated through the bearing from an external supply, but in cases where there is no such supply available, an oil circulating device operated by the rotation of the shaft must be provided, one method of doing so is described in U. S. Patent No. 1,336,373, granted April 6, 1920, to me.

A difficulty in connection with such lubricating devices is to get the lubricant past one pad in order to lubricate the one following. In U. S. Patent No. 1,336,373, referred to above, this is effected by forming passages within the thickness of the bearing elements, so that surplus lubricant from one element can pass on to the next of the series.

The present invention has for its object a simpler and more effective method of securing the lubrication of a series of such bearing elements, and consists in arranging the circumscribed edges of the actual bearing portions of the elements so that these portions are trapezoidal in shape having recessed parts adjacent to three of their sides. The bearing elements are arranged so that adjacent trapezoidal portions are oppositely directed or staggered, the recessed parts forming together a continuous and sinuous channel so that surplus lubricant passing along the sides of one bearing element or block feeds the following one, and so on.

By this arrangement, lubricant fed to or picked up by the rotating shaft at any one point in the circle is, by its adhesion to the rotating shaft and special shape of the bearing element, supplied separately to each.

Some examples of bearings having the invention applied are illustrated in the accompanying drawings, in which:—

Figs. 1 and 2 are sections of a line shaft journal bearing in which the pads are mounted on pins carried by lugs on the housing of the bearing and coact with a collar dipping into an oil bath, Fig. 2 being a section taken through A. B. of Fig. 1, and Fig. 1 being a section taken through C. D. of Fig. 2.

Fig. 3 shows a developed view of pads shown in Figs. 1 and 2.

Fig. 4 is a vertical section of another bearing in which the pads are supported directly on the housing of the bearing and likewise coact with a collar on the shaft and dipping into an oil bath.

Fig. 5 is a section on the line C. D. in Fig. 4.

Fig. 6 is a developed view of the pads shown in Figs. 4 and 5.

Fig. 7 is a vertical section of a bearing in which the pads coact directly with the shaft, the lubricant being picked up from an oil bath by a lubricating ring.

Fig. 8 is a development of the pads in Fig. 7.

Fig. 9 is a section on the line E. F. in Fig. 10 of a third form of journal bearing embodying the invention.

Fig. 10 is a section on the line G. H. in Fig. 9, a portion of the bearing housing being included.

Fig. 11 is a side view, with parts in section, showing guides for a slipper of a reciprocating engine.

Fig. 12 is an end view of the parts in Fig. 11, the guides being shown in section, and Fig. 13 is a plan of the slipper and pads shown in Fig. 11.

In the arrangement illustrated in Figs. 1-3, the four pads 5 coact with a collar 1 which may be either formed solid with the shaft 2, or as shown be attached to it by means of wedges 3 and nut 4 in known manner. The pads may be loosely mounted on pins 6 passing through lugs 7 on the backs thereof and located axially by corresponding lugs 8 on the housing 9 of the bearing.

The lower edge of the collar dipping into the oil bath 10 picks up oil which is carried round by its rotation and passes along the sinuous space 11 between the pads so lubricating each in turn.

In the example shown in Figs. 4, 5 and 6, the pads 12 are supported directly in the housing 13 of the bearing and coact with the collar 14 formed on or carried by the shaft 15 and dipping into the oil bath 16.

In order to ensure that the pads 12 shall always be correctly assembled, alternate pads may be made with the corners notched and the remaining pads with corner projections, as shown at 17, 17ª in Fig. 6.

In the example depicted in Figs. 7 and 8, the pads 18 coact directly with the shaft 19 and the lubricant is picked up from an oil bath 20 by a lubricating ring 21 in known manner.

The rotation of the shaft causes the oil ring 21 to pick up oil from the oil chamber 20 and put it on to the top of the shaft.

At 22 an oil deflector of known construction is fitted which deflects the oil deposited on the shaft into the sinuous passage 23 formed by the special construction of the pads and so enables the oil to be applied to each of them.

Oil drain-holes may be fitted at 27 so that a continuous supply of oil can be fed in at the left hand side of the bearing in Fig. 7 and the surplus allowed to escape at the right-hand side. Creep of the oil along the shaft can be prevented by a similar oil scraper 24 placed in the reverse direction near the escape.

In the three examples above described the pads are pivoted or rockably supported, but in the example illustrated in Figs. 9 and 10 the bearing blocks 25 are not pivoted but each is formed as indicated in Figs. 5 and 7 of U. S. Patent No. 1,315,735, referred to above, with a relatively weak or flexible portion 26 of varying thickness on its leading side in the direction of rotation of the shaft, but in accordance with the present invention the bearing portions of the blocks are made trapezoidal in shape and have recessed parts on three sides so as to form sinuous passages for effecting the lubrication of all the surfaces by means of oil supplied at one point only.

In the example shown in Figs. 11–13, the invention is shown applied to reciprocating engine guides, 28 being a piston rod slipper moving between guides 29, 30 and provided with an opening 31 for the pin of a connecting rod. The faces of the slipper in abutment with the guides are recessed to accommodate the pads 32, the actual bearing portions of which are trapezoidal in shape with recessed marginal parts 33 forming a sinuous passage.

It may in some cases be found advantageous to form passages through the trapezoidally shaped portions of the bearing elements, in addition to providing for the continuous sinuous recessed channel around those portions.

Having thus described the nature of the said invention and the best means I know of carrying the same into practical effect, I claim:—

1. A lubricated bearing, comprising a bearing housing, and a series of pads arranged in following relation for engagement with the surface to be lubricated, the pads having each a bearing surface trapezoidal in shape, the trapezoidal portions of adjacent pads being oppositely directed, whereby surplus lubricant from one pad is, by its adhesion to the surface to be lubricated, diverted to the next pad in series, substantially as described.

2. A lubricated bearing, comprising a a bearing housing, and a series of pads arranged in following relation for engagement with a surface to be lubricated, the pads having each a trapezoidal shaped bearing surface, said pads being recessed on three of their sides and so arranged that adjacent trapezoidal portions are oppositely directed, whereby the recessed parts form a continuous and sinuous channel so that surplus lubricant from one pad is, by its adhesion to the surface to be lubricated, diverted to the next pad in series, substantially as described.

3. A lubricated bearing, comprising a bearing housing, and a series of pads arranged in following relation for engagement with a surface to be lubricated, the pads having each a bearing surface trapezoidal in shape and being so arranged that adjacent trapezoidal portions are oppositely directed, whereby surplus lubricant from one pad is, by its adhesion to the surface to be lubricated, diverted to the next pad in series, alternate pads having recessed corners and the remaining pads having projections at corresponding corners.

In testimony whereof I have signed my name to this specification.

HENRY T. NEWBIGIN.